BEST AVAILABLE COPY

March 30, 1926.

F. H. VAN HOUTEN 1,578,617

DOUGH PROOFING CABINET

Filed April 18, 1922

Inventor
Frank H. Van Houten
Church & Church
Attorneys

March 30, 1926.

F. H. VAN HOUTEN 1,578,617

DOUGH PROOFING CABINET

Filed April 18, 1922

Inventor

Frank H. Van Houten

By Church & Church

His Attorneys

Patented Mar. 30, 1926.

1,578,617

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUGHPROOFING CABINET.

Application filed April 18, 1922. Serial No. 555,519.

*To all whom it may concern:*

Be it known that I, FRANK H. VAN HOUTEN, a citizen of the United States, residing at Beacon, in the county of Dutchess and State of New York, have invented certain new and useful Improvements in Doughproofing Cabinets; and I do hereby declare the following to be a full, clear, and exact description of the same, reference being had to the accompanying drawings, forming part of this specification.

This invention relates to dough proofing cabinets and has for its object the provision of a simple, yet efficient, means for guiding the lumps of dough from one reach of the conveyor to the next lower reach insuring correct spacing of the lumps of dough and also insuring that each lump shall be turned bottom side up at each discharge from an upper to a lower conveyor reach.

In dough proofing cabinets it has been customary to allow a space of approximately twelve inches for each lump of dough in order that the lumps shall not be in contact even though two or three of them should fall in succession in the wrong direction. By actual experience covering a number of years it has been found absolutely essential that something be used to guide the lumps of dough in their drop from one belt to the next and although various means have been shown for guiding the balls of dough they have not been found entirely satisfactory in that they are not reliable in their control. For instance a piece of dough in dropping against the funnel shown in my Patent No. 1,115,621 of November 3, 1914, usually assumes the position shown in Fig. 5, the theory being that the action of the lower belt will cause the dough to drop backward with respect to the movement of the receiving belt.

In actual practice, however, this dropping backward of the dough does not always happen and the lumps not infrequently drop in the direction shown in Fig. 6, which, of course, changes the distance of the spacing, that is, the lump of dough shown as dropping in Fig. 6, will, when it lands upon the lower belt, be considerably nearer to the preceding lump of dough than that piece of dough is from the adjacent lump. Should the pieces always drop as shown in Fig. 5 fairly uniform work could be obtained and there would be no need for the present invention, but as actually happens where an occasional lump drops forward as shown in Fig. 6 the spacing is immediately disturbed and if the same piece happens to turn in the wrong direction several times it finally comes into close contact with the piece leading it and consequently it happens that at times several pieces are found bunched together some coming in contact with each other and then a long space of vacant belt.

In the drawings,—

Figs. 5 and 6 are illustrative drawings, showing in Fig. 5 the correct way a lump of dough should fall, and in Fig. 6 showing the incorrect way.

Figure 1:
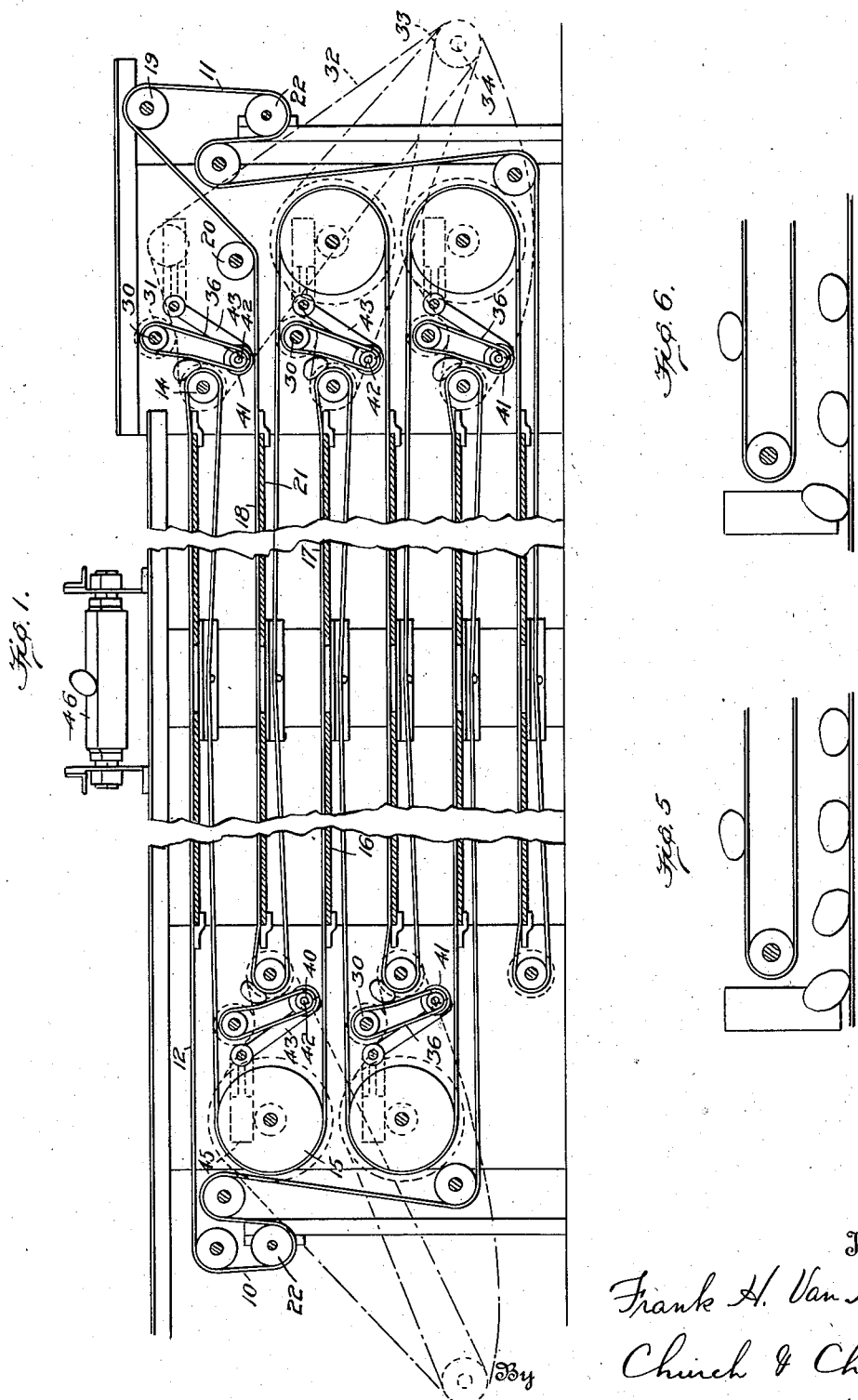
Figure 1 is a side elevation of a proofing cabinet containing the preferred embodiment of the present invention.
Figure 2:
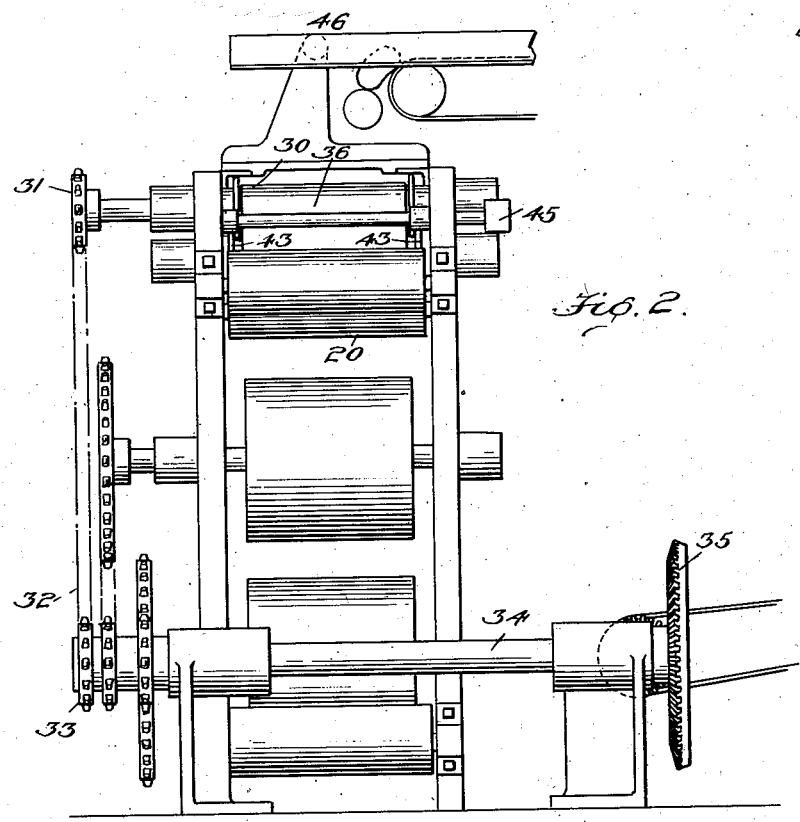
Fig. 2 is an end view of the cabinet.

The cabinet shown, as far as the main belts are concerned, is of standard type, the various carrying reaches of the belt being formed by two endless belts 10 and 11, the former providing the top carrying reach 12, then passing over a roll 14 and returning to the main drive roll 15 from the lower edge of which it passes over the table 16 forming the third carrying reach 17, the intermediate or second carrying reach 18 being formed by the belt 11 which passes from the idle roll 19 under the guide roll 20 and over the table 21.

The means for tightening belt 10 is similar to that for belt 11, consisting in a relatively heavy roll 22 free to move vertically but constrained to move so as to remain parallel with the axes of the various rolls of the cabinet. These tensioning rolls vary in weight in accordance with the length and breadth of the belt, for the usual standard size weighing from sixty to seventy-five pounds each and having a rise and fall of from eight to twelve feet. As will be understood by those familiar with the art it is essential that the belts shall be sufficiently tight to be driven by the guide rolls such as 15 and yet they must be tensioned in such a manner that when the belt shrinks as a result of absorbing moisture from the lumps of dough, the rolls shall not bind in their bearings.

Figure 3:
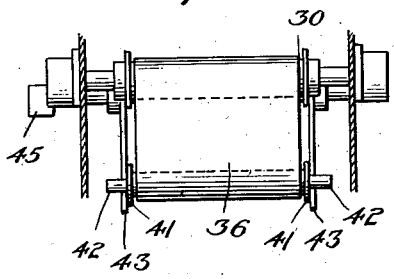
Fig. 3 is an end elevation of one of the auxiliary belts and its mountings.
Figure 4:
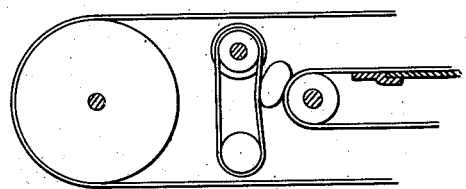
Fig. 4 is a side elevation of a modified form of auxiliary belt.

The five auxiliary belts shown in Fig. 1 are identical so that a description of one will suffice for all. The roller 30 is mounted at either end in the frame of the cabinet and carries at one end a sprocket wheel 31 connected by a chain 32 with the sprocket 33 on the main drive shaft 34 which receives its power through the bevel gear 35 or in any other manner from a prime mover, not shown. The auxiliary endless belt 36 is supported entirely by the roller 30 which drives it and it may be free to swing as shown in Fig. 4, but is preferably constrained in its movement as in Figs. 1 and 3 in which figures a weighted roll 40 is suspended, this roll being entirely free except as later described.

Preferably the roller 40 carries a pair of flanges 41 to prevent its slipping from side to side and has extending stems 42 which lie in the path of the arms 43 of the bell crank lever which has its upper arm heavily weighted as at 45 so that the tendency of the weight is to hold the belt 36 in proximity to the belt 10 as it passes over roll 14, this action being a yielding one, however, so that a lump of dough may pass between the belt 36 and the belt 10 without being unduly deformed.

The operation of the device is as follows: The balls of dough are delivered to the proofer by the elevator 46 discharging upon the top reach 12 of the belt 10 and are carried toward the roller 14. Upon coming to the end of the reach the balls of dough engage the endless belt 36 which yields sufficiently to allow the ball of dough to pass between the belts 10 and 36 without undue deformation; and the shorter belt holds the ball of dough in proper position until almost the moment it touches the bottom belt, thus insuring that the ball of dough shall be turned bottom side up in its transfer from one reach to another, this being quite important as the yeast ferment works upward and if the ball of dough is not reversed the gas will escape from the lump.

The ball of dough now passes along carrying reach 18 to the next guiding belt 36 and is delivered in the same way as previously described to the third carrying reach 17, and so on throughout the entire length of the proofer belts.

These depending guiding belts 36 should be of considerable weight but at the same time must be flexible. By attaching narrow strips of iron to the inside of the belt forming a series of staves the belt would be an improvement over the old funnels but would have the disadvantage that these belts would then assume a swinging motion which would not always be in unison with the piece of dough coming against them. For this reason the preferred form of guiding roll and belt is as shown in Figures 1 and 3, the weighted levers holding the endless guiding belts in the position shown, thus being free from the objectionable swinging while insuring absolute uniformity of the balls of dough upon the bottom belt. In the modified form shown in Fig. 4 the weight roll retains the belt in a strained position as in Fig. 3, but this type being entirely free at its lower end is naturally subject to the rhythmic swinging.

What I claim is:

1. In a conveyor, an endless carrying belt adapted to be engaged by one face of an article, a second lower endless belt having a carrying reach positioned to receive the articles discharged from above by the first mentioned belt and adapted to be engaged by the opposite face of said articles, and an auxiliary belt free to swing about a horizontal axis positioned beyond the discharge end of the first mentioned belt in proximity to and above the second belt to guide said articles from one belt to the other, said articles being received on the lower belt bottom side up whereby said belts will be engaged by opposite faces of the articles.

2. In a conveyor, an upper endless belt having a carrying reach adapted to be engaged by one face of an article, a second lower endless belt having a carrying reach substantially parallel to the carrying reach of the upper belt and positioned to receive articles discharged from the upper belt, the opposite sides of said articles engaging the reach of the lower belt and an auxiliary belt positioned beyond and out of contact with the discharge end of the upper belt to guide said articles from one belt to the other, said articles being received on the lower belt bottom side up whereby said belts would be engaged by different faces of the articles.

3. In a conveyor, an endless belt having a substantially horizontal carrying reach, a second belt having a carrying reach below the carrying reach of said first mentioned belt and adapted to receive articles discharged therefrom, and an auxiliary belt having a substantially vertical guiding surface positioned beyond the discharge end of the first mentioned belt and extending into proximity with the carrying reach of said second belt.

4. In a dough proofing cabinet, a substantially horizontal moving surface, an endless conveyor having a reach located above said moving surface with said moving surface extending beyond the discharge end of said reach, a roller mounted beyond the discharge end of said reach and above said moving surface, an endless belt mounted on said roller and presenting a guiding surface to engage an article being discharged from said reach, and a roll within said endless belt and supported thereby in proximity to said moving surface so that said roll is yieldingly held against the article being discharged from said reach, and a weighted lever adapted to hold the lever end of the endless belt against an article being discharged.

5. An auxiliary guiding device for a conveyor including a rotatable shaft, a roller on said shaft, an endless belt on said roller, a roll supported solely by said belt and adapted to hang vertically by the action of gravity, a pivoted weighted lever having its free arms adapted to press against the lower roll to hold the endless belt in yielding contact with an article being discharged from said conveyor.

6. In a conveyor, an upper belt having a carrying reach adapted to be engaged by one face of an article, an auxiliary belt having a guiding surface at substantially a right angle to the plane of said carrying reach and a moving surface in proximity to but out of contact with said auxiliary belt and receiving articles discharged from said upper belt, said moving surface receiving said articles with their bottom sides up whereby opposite faces of the articles successively engage the belts.

7. In a dough proofing cabinet, a belt having a carrying reach, a second carrying belt beneath the same and adapted to receive lumps of dough discharged from the first mentioned belt and to carry said articles in an opposite direction, a depending belt spaced from each of said carrying belts and having its proximate face intersecting the plane of the carrying reach of said first mentioned belt, so that said lumps of dough in being discharged from one carrying belt to the other will be in simultaneous contact with said first mentioned belt and said depending belt and will therefore be turned bottom side up on the second belt.

8. In a dough proofing cabinet, the combination of two endless belts each providing a plurality of carrying reaches, certain of the reaches of either belt being substantially parallel to, spaced from, and overlapping the carrying reaches of the other belt, and an auxiliary belt positioned transversely to each of said parallel reaches in proximity to its discharge end to guide a lump of dough delivered to the next lower reach and insure its being turned bottom to top at each discharge.

9. In a dough proofing cabinet, the combination of two endless belts each providing a plurality of carrying reaches certain of the reaches of each belt being substantially parallel to, spaced from, and overlapping the proximate carrying reach of the other belt, a plurality of auxiliary belts located in proximity to the discharge end of each reach and having a substantially vertical guiding surface, means to hold the lower end of said auxiliary belts in yielding contact with an article being discharged from an upper to a lower reach and an automatic tension device for each of said belts operated by gravity and adapted to compensate for the shrinkage of the belt due to absorption of moisture from said lumps of dough.

FRANK H. VAN HOUTEN.